M. STEPHENS.
Cement-Lined Pipes.

No. 142,528. Patented September 2, 1873.

Witnesses
Chas. H. Smith
Geo. T. Pinckney

Inventor
Melvin Stephens
per Lemuel W. Serrell
Atty.

UNITED STATES PATENT OFFICE.

MELVIN STEPHENS, OF BROOKLYN, NEW YORK.

IMPROVEMENT IN CEMENT-LINED PIPES.

Specification forming part of Letters Patent No. 142,528, dated September 2, 1873; application filed July 24, 1873.

*To all whom it may concern:*

Be it known that I, MELVIN STEPHENS, of Brooklyn, in the county of Kings and State of New York, have invented an Improvement in Cement-Lined Metal Pipes, of which the following is a specification:

Difficulty sometimes arises in joining cement-lined pipes from the change of relative position of one end to the other during the operation of applying cement around the joint. To obviate this difficulty I have made the end of one pipe concave or conical, and the adjacent end of the next pipe convex or tapering to set into the same, as seen in Letters Patent No. 137,970, granted to me April 15, 1873.

My present invention relates to combining with this character of pipe a socket, into which cement, lead, or other material is introduced for packing the cement-lined pipe at the joint, and rendering the same water-tight. I also introduce a branch thimble or T, in a manner that prevents risk of injury from pressure or in handling, and also produces a gradual curve and taper at the junction of the main and branch, thereby insuring a uniformity of pressure in the main and branch, and preventing the flow of water past the branch, lessening the pressure in such branch.

Figure 1:
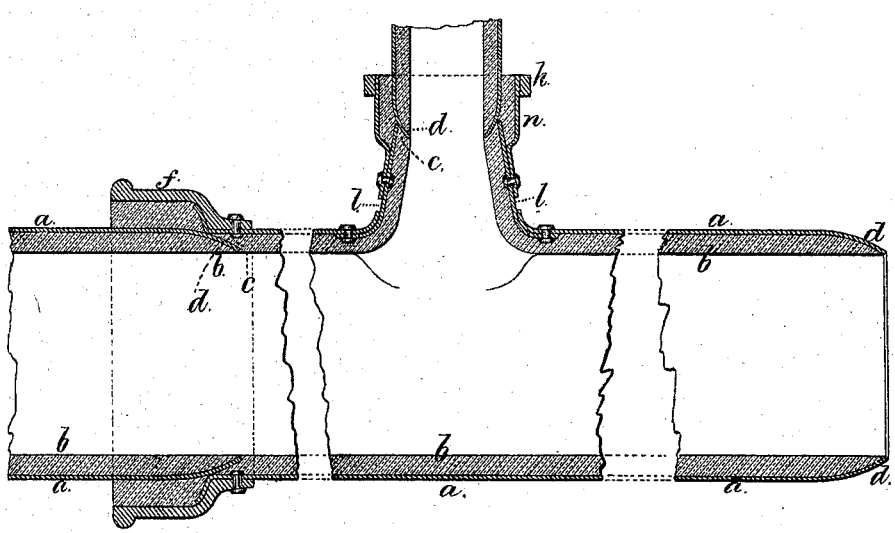
Figure 1:
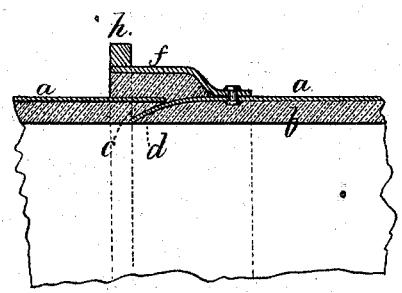

In the drawing, Figure 1 is a section of one length of pipe with the coupling-socket at one end made of cast metal, and the T or branch extending off from one side; and Fig. 2 is a section of the joint with the coupling-socket of wrought metal.

The sheet-metal tube *a* is of any desired size, and it is lined with cement *b*. At one end of the section or length there is the recess *c*, and at the other end the taper *d*, to fit the same. These should be zones or segments of a sphere of a diameter corresponding to that of the pipe, so that the surfaces at the ends of the pipe may remain in contact, whether the lengths of pipes are laid in line or at an angle to each other. The metallic sockets *f* are attached to the sheet-metal pipe or branches and surround the joint, so as to receive the cement, lead, or other metal employed to secure the joint from leaking. When this metal socket *f* is attached to the cylindrical end of a sheet-metal tube, *a*, as in Fig. 1, the extreme end of the sheet metal may be spread around within the bottom of the socket, as represented, and into this the tapering end of the next length passes.

Where the socket is of sheet metal, as in Fig. 2, the position of the parts may be reversed, the socket being riveted upon the tapering end of the sheet-metal tube and surrounding the same, so that the cylindrical end of the next length, with the recessed cement lining, may set upon the same, and the joint be packed tightly, as before.

It is preferable to employ the metallic ring *h* to stiffen the metallic socket and prevent the pipe changing shape under external pressure.

When the socket is made of cast-iron, and adapted to receive the cylindrical end of the next sheet-metal pipe, the tapering end for such pipe may be cast within the socket, and then such socket will be made to receive and be riveted upon the cylinder of sheet metal forming the metal tube.

In order to unite a T or branch to a main pipe, it has been usual to flange a cylinder by cutting it and bending the sheet metal, and employing a metal ring to set over the separate metal tongues, and these parts are riveted together. This makes the intersecting pipe without any enlargement at the entrance to the main pipe; hence there is not a free flow of water into the branch, and the construction is costly, and liable to become injured and leaky. To avoid these difficulties I make the intersecting thimble *l* of a conical shape, with a flaring end, corresponding in shape to the opening in the sheet-metal tube of the main pipe, and the metal is bent, as represented, so that the parts can be easily riveted together, and the flange of the thimble is within the main pipe, thereby it is much more strong and durable than heretofore, and the pressure and strain do not tend to separate the parts. The cement lining is applied within this thimble, as shown, and hence the entrance from the main to the branch is a broad mouth or funnel shape. The socket *n* is either of sheet or cast metal, and is riveted to the thimble *l*, and receives the end of the branch pipe, and it is packed, as before set forth.

I claim as my invention—

1. The metallic socket attached to the sheet-metal tube of a cement-lined pipe, and combined with the tapering or zone-shaped end of the tube that enters the recessed end of the next tube, and around which the packing is introduced within the socket, substantially as set forth.

2. The conical or tapering thimble $l$, with its flange inside of and connected with the sheet-metal tube, and lined with cement, as set forth, for forming the connection to the branch pipe, as specified.

Signed by me this 21st day of July, A. D. 1873.

MELVIN STEPHENS.

Witnesses:
  GEO. T. PINCKNEY,
  CHAS. H. SMITH.